United States Patent [19]

Smith

[11] Patent Number: 4,567,787

[45] Date of Patent: Feb. 4, 1986

[54] COMPOUND PLANETARY HYDRO-MECHANICAL TRANSMISSION WITH SPEED-RESPONSIVE CENTRIFUGAL CLUTCH MEANS

[76] Inventor: Roger R. Smith, 7261 Lyons Rd., Imlay City, Mich. 48444

[21] Appl. No.: 550,333

[22] Filed: Nov. 10, 1983

[51] Int. Cl.$^4$ .................... F16H 47/04; F16H 3/74; F16D 21/04
[52] U.S. Cl. .................... 74/687; 74/752 E; 192/20; 192/105 BB
[58] Field of Search ............ 74/687, 677, 682, 688, 74/660, 750 R, 752 E, 752 F, 805, 751, 679, 640; 192/105 BB, 105 A, 20, 3.52

[56] References Cited

U.S. PATENT DOCUMENTS

| | | | |
|---|---|---|---|
| 1,701,823 | 2/1929 | Rhodes | 74/752 F |
| 2,179,405 | 11/1939 | Falco | 74/752 F |
| 2,182,385 | 12/1939 | Neracher | 192/105 BB |
| 2,701,974 | 2/1953 | Miller | 74/752 E |
| 3,175,666 | 3/1965 | Katzenstein | 74/752 F |
| 3,852,998 | 12/1974 | Leeson | 74/687 |
| 4,024,776 | 5/1977 | Stinson | 74/687 |
| 4,080,847 | 3/1978 | Thomas | 74/682 |
| 4,181,044 | 1/1980 | Read | 74/752 E |
| 4,281,564 | 8/1981 | Hill | 74/687 |
| 4,472,984 | 9/1984 | Cook | 74/677 |

FOREIGN PATENT DOCUMENTS 2097875 11/1982 United Kingdom ............. 74/752 E

Primary Examiner—William F. Pate, III
Assistant Examiner—David Novais
Attorney, Agent, or Firm—Peter A. Taucher; John E. McRae; Robert P. Gibson

[57] ABSTRACT

A hydro-mechanical transmission wherein the mechanical power path comprises three planet gears rotating at different speeds (for any given speed of the associated sun gear). The hydrostatic power path includes a different sun gear, three other planet gears, and a ring gear. Clutch mechanisms are arranged to selectively connect different ones of the mechanically-driven planet gears to associated ones of the hydrostatically-driven planet gears.

The percentage of power through the hydrostatic and mechanical power paths varies according to the rotational speed of the output member (ring gear). The transmission occupies a relatively small space, while providing a multiplicity of different hydrostatic-mechanical power hook-ups.

9 Claims, 11 Drawing Figures

COMPOUND PLANETARY HYDRO-MECHANICAL TRANSMISSION WITH SPEED-RESPONSIVE CENTRIFUGAL CLUTCH MEANS

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a power transmission of the hydro-mechanical type. In such transmissions the engine crankshaft delivers power to the vehicle wheels (or drive sprockets) through two power paths. One power path comprises a hydraulic pump-motor system; the other power path comprises a mechanical power path. Usually in the low speed range the entire engine output is directed through the hydraulic pump-motor system. As the system speed increases a progressively greater percentage of the power is directed through the mechanical path. Usually the power shift (from the hydraulic path to the mechanical path) occurs in discrete steps or gear ratios.

The present invention seeks to provide a hydro-mechanical transmission that is relatively compact and inexpensive. The hydraulic power path includes a planetary gear system wherein a planet gear carrier is held motionless or allowed to rotate according to different operational modes. In the "park" or "neutral" modes the carrier is allowed to freely rotate. In the drive modes the carrier is held motionless; operation of a hydraulic motor in one direction rotates a sun gear in one direction, producing non-orbital rotations of the planet gears in the forward drive direction. Operation of the hydraulic motor in the opposite direction causes the sun gear and non-orbiting planet gears to rotate in the reverse drive direction. A ring gear (meshed with the planet gears) constitutes the transmission output.

The mechanical power path includes a second sun gear and associated planet gears. Each planet gear has a different diameter so that each planet gear has a different rotational speed (for a given sun gear speed). Centrifugal clutch mechanisms are arranged between the planet gears in the hydraulic path and mechanical path, such that speed increase in the hydraulic power path causes the mechanical power path planet gears to be sequentially connected into the drive system.

The system utilizes a minimum number of gears and clutch mechanisms to achieve a large number of forward speed ratios. In one particular system four forward speed ratios are achieved with only two planet gear assemblies.

The transmission can be used in various vehicles or stationary installations (generator drives, pump or fan drives, winch drives, etc.). However it was particularly designed for use in tracked vehicles (e.g., military tanks). As used in tracked vehicles, two transmissions would be employed, one for each track drive sprocket. The individual transmissions would in some cases be small enough to permit the engine to be mounted in a transverse orientation (i.e., with the engine crankshaft axis extending crosswise of the vehicle longitudinal axis). A transverse orientation of the engine could somewhat reduce the overall vehicle length allocated to the power plant, thereby permitting economies in tank size, armor, and weight.

THE DRAWINGS

FIG. 11 is taken on line 11—11 in FIG. 10.

Figure 1:
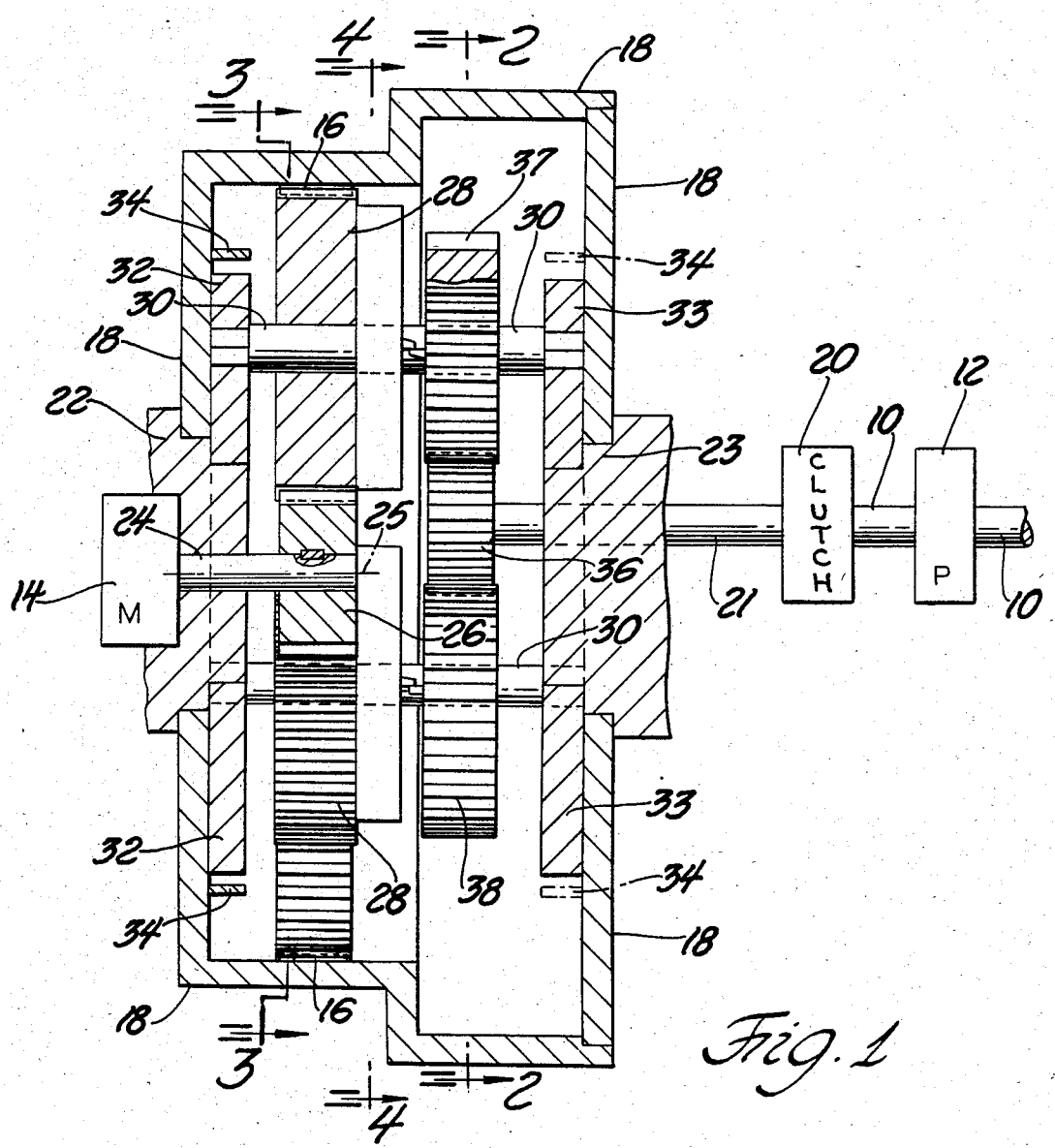
FIG. 1 is a sectional view through a transmission embodying my invention.

Referring in greater detail to FIG. 1, there is shown a transmission that includes an input shaft 10 connected to a non-illustrated engine. Shaft 10 drives a reversible variable displacement hydraulic pump 12 which supplies pressurized hydraulic fluid to a reversible fixed displacement hydraulic motor 14. Pump 12 could be an electric generator, in which case motor 14 would be an electric motor.

Pump 12 and motor 14 constitute a hydraulic means for delivering engine power through a first power path to a ring gear 16 carried by a rotary casing 18. A second mechanical power path extends from shaft 10 through clutch mechanism 20. Casing 18 constitutes the only driven output means for the illustrated transmission.

If the invention were used in a military tracked vehicle two transmissions of the type shown in FIG. 1 would probably be employed. Each transmission would have its casing 18 arranged to drive one of the track drive sprockets. The engine (not shown) could be arranged crosswise of the vehicle in the space between the two transmissions.

Figure 3:
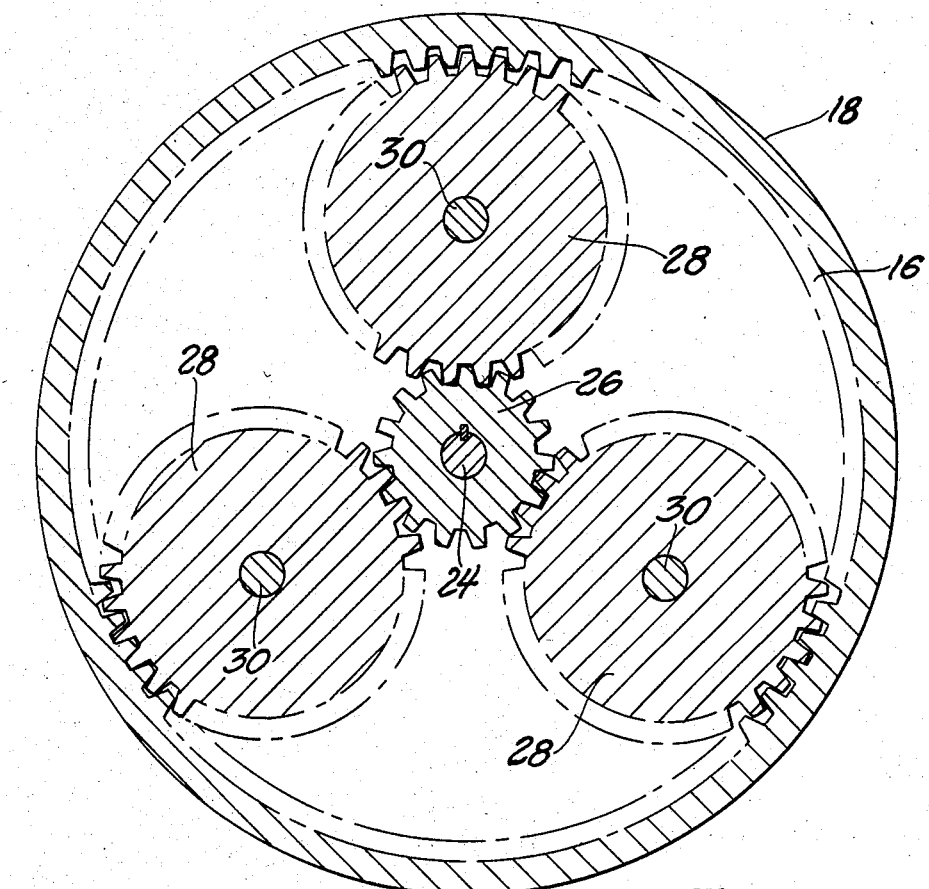
FIG. 3 is a sectional view on line 3—3 in FIG. 1.
Figure 4:
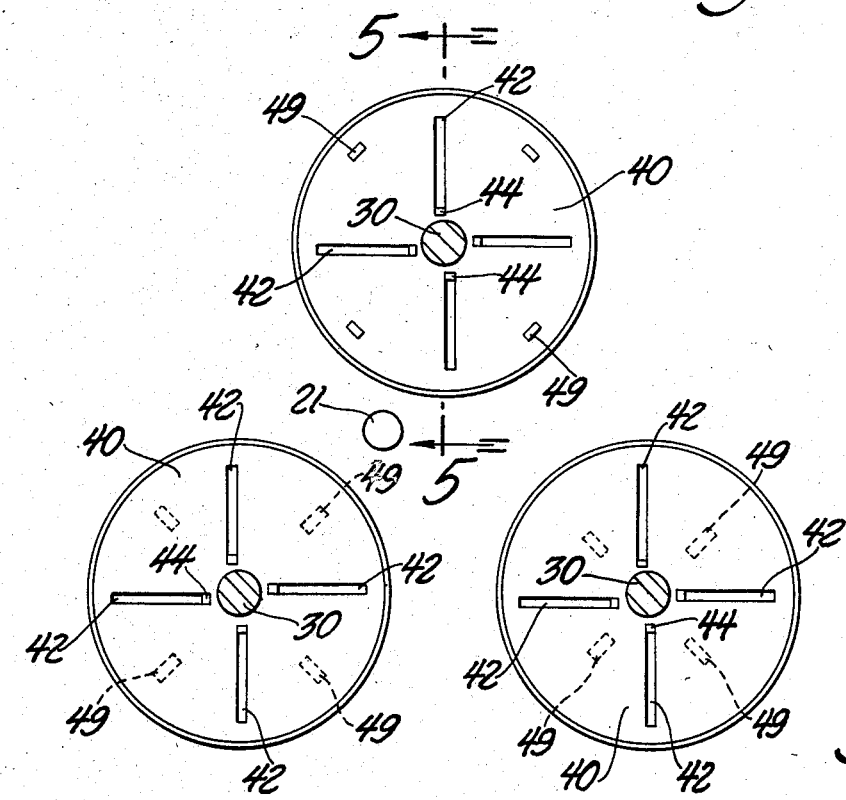
FIG. 4 is a sectional view on line 4—4 in FIG. 1.

In the illustrated arrangement motor 14 is mounted on fixed hub structure 22 with its shaft 24 connected to a sun gear 26. As best seen in FIG. 3, gear 26 meshes with three planet gears 28, each having the same diameter and rotational speed. Gears 28 are in driving relation with ring gear 16 and the associated casing 18.

Planet gears 28 are individually mounted on three shafts 30 that extend between two circular disk arm structures 32 and 33 (FIG. 1). Each arm (or disc) structure is freely rotatable on a fixed hub structure 22 or 23. Arm structures 32 and 33, and connected shafts 30 collectively constitute a rotary carrier for the three planet gears 28 (and other planet gears to be described hereinafter). Gears 28 are freely rotatable on the associated shafts 30.

The circular peripheral edge of arm structure 32 (and/or arm structure 33) registers with a disengageable brake means, shown as a brake band 34. A hydraulic piston-cylinder means (not shown) is used to draw band 34 against the edge of arm structure 32, to thereby hold the planet gear carrier motionless. With band 34 in its disengaged condition (as shown) sun gear 26 rotation is ineffective as a drive device; the planet gears orbit around the sun gear without transmitting drive forces to the ring gear. The system is then in the "park" or "neutral" modes.

In the engaged condition of the brake the various planet gear shafts 30 are held motionless; sun gear 26 rotation causes planet gears 28 to rotate around their individual axes, thereby rotating ring gear 16 in the forward drive direction (or reverse drive direction).

The direction of sun gear rotation is determined by the control setting for hydraulic pump 12. Adjusting the pump overcenter reverses the oil flow and hence the direction of rotation of hydrostatic motor 14 and sun gear 26. Sun gear 26 rotation causes planet gears 28 to rotate the planet gears around their individual axes, thereby driving the ring gear (in forward or reverse). In the tracked vehicle environment the pump controls for the two transmissions could be oppositely adjusted to achieve a pivot steer operation.

Figure 2:
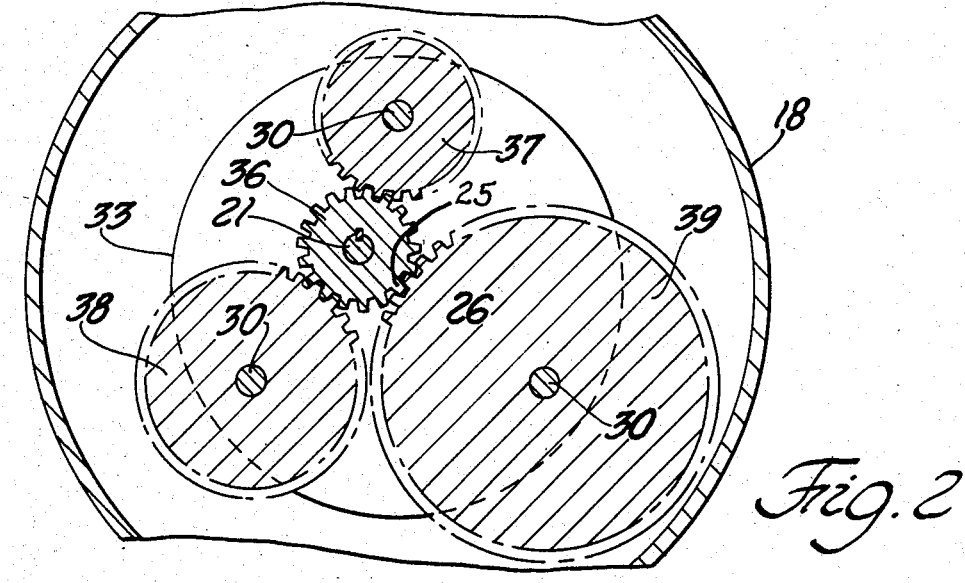
FIG. 2 is a sectional view on line 2—2 in FIG. 1.

The aforementioned clutch 20 has an output shaft 21 extending through stationary hub structure 23. A sun gear 36 affixed to shaft 21 meshes with three planet gears 37, 38 and 39 (FIG. 2) that are freely rotatable on the previously mentioned carrier shafts 30. It should be noted that sun gear 36 has its rotational axis offset from axis 25 of the previously mentioned shaft 24. Also, the three planet gears 37, 38 and 39 are of different diameters such that each gear has a different rotational speed (for a given shaft 21 speed).

Each of the three planet gears 37, 38 and 39 is exactly aligned with one of the previously mentioned planet gears 28 (because of its location on the common shaft 30). It is intended that the various planet gears 37, 38 and 39 will be sequentially put into operative driving engagement with the aligned planet gears 28 as the hydrostatic power gear system speeds up from its zero standstill condition (assuming the vehicle is moving in the forward direction). The slowest moving gear 39 will be engaged first, then the intermediate speed gear 38, and finally the fastest speed gear 37. Gears 37, 38 and 39 are of course rotating only when clutch 20 (FIG. 1) is in its engaged condition. Clutch 20 is disengaged to set the transmission for reverse motion or forward motion in the lowest speed range. To run in the higher forward speed ranges clutch 20 is placed in its engaged condition.

Each planet gear 37, 38 or 39 is put into driving engagement with the associated planet gear 28 by means of a centrifugal clutch means (or synchronizer) responsive to planet gear 28 rotational speed. Any commercially available centrifugal clutch mechanism could be used for the three individual clutches. FIGS. 5 through 9 illustrates one particular form that each individual clutch can take.

Figure 5:
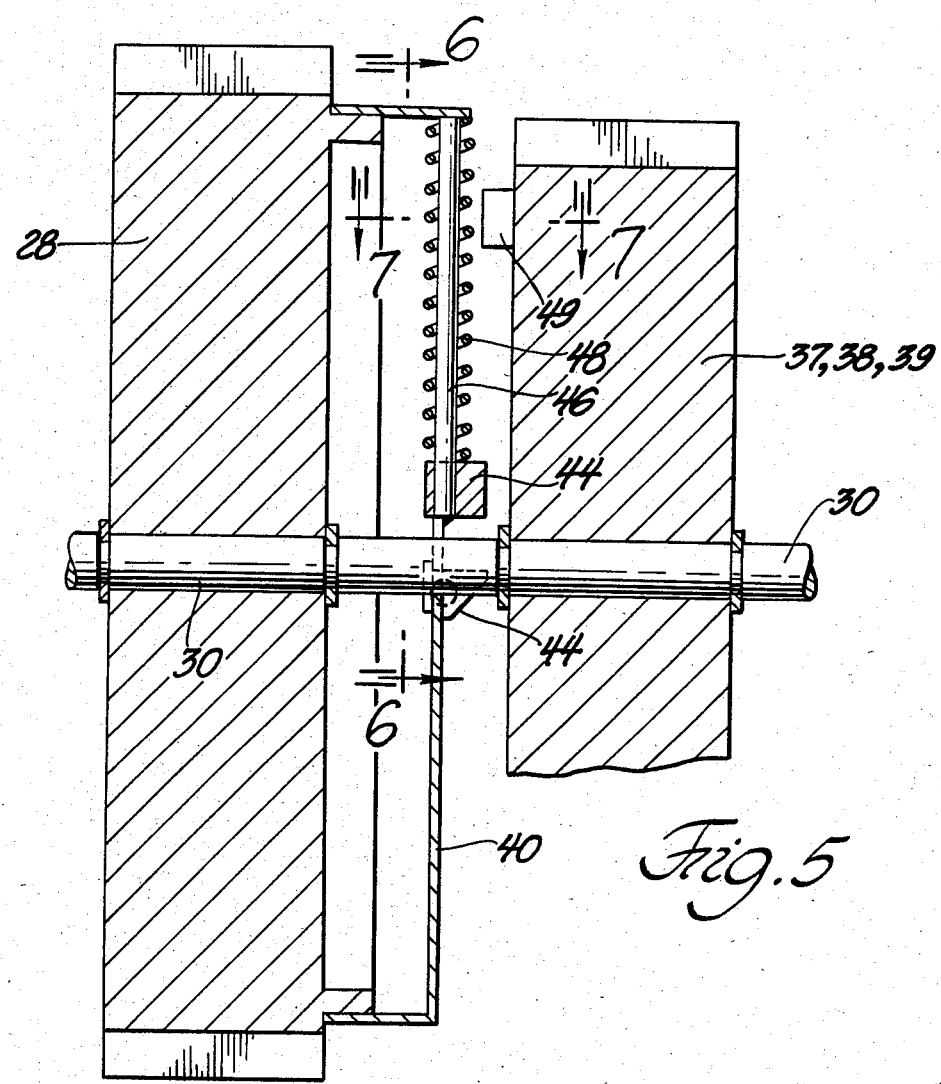
FIG. 5 is a fragmentary enlarged sectional view on line 5—5 in FIG. 4.
Figure 6:
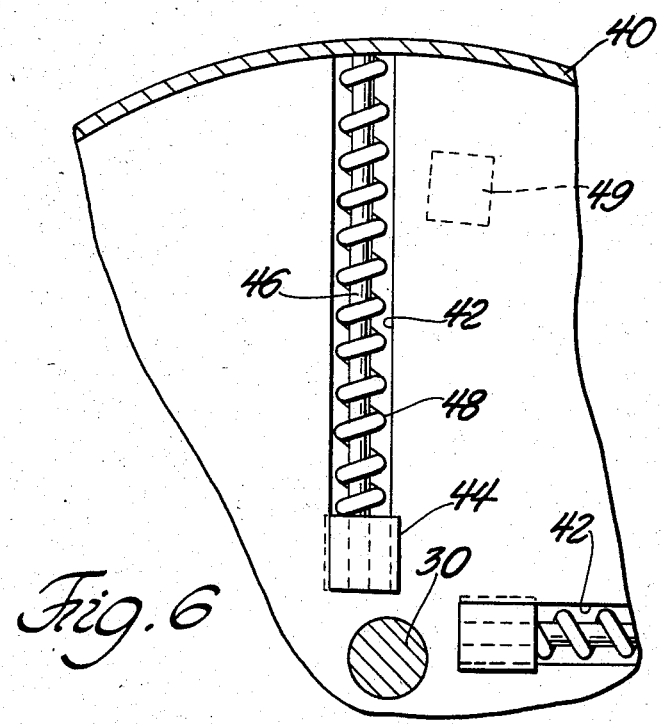
FIG. 6 is a fragmentary sectional view on line 6—6 in FIG. 5.

As shown in FIGS. 5 and 6, the representative centrifugal clutch includes a circular plate 40 suitably attached to the right face of planet gear 28. Plate 40 has four radial slots 42 therein for accommodating four radially movable clutch elements 44. Each clutch element is slidably mounted on a radial shaft or rod 46 extending along slot 42; a compression coil spring 48 encircles each rod to bias each clutch element 44 toward the rotational axis of planet gear 28.

As each planet gear 28 speeds up centrifugal force moves clutch elements 44 radially outwardly against the actions of springs 48. At some point in their outward travels the clutch elements will be in circumferential alignment with clutch elements (lugs) 49 affixed to the adjacent faces of planet gears 37, 38 or 39. At that time clutch elements 44 will be operatively engaged with clutch elements 49 so that the associated planet gear 37, 38 or 39 will apply additive driving forces to the planet gears 28 (i.e., in addition to the force provided by sun gear 26).

Figure 7:
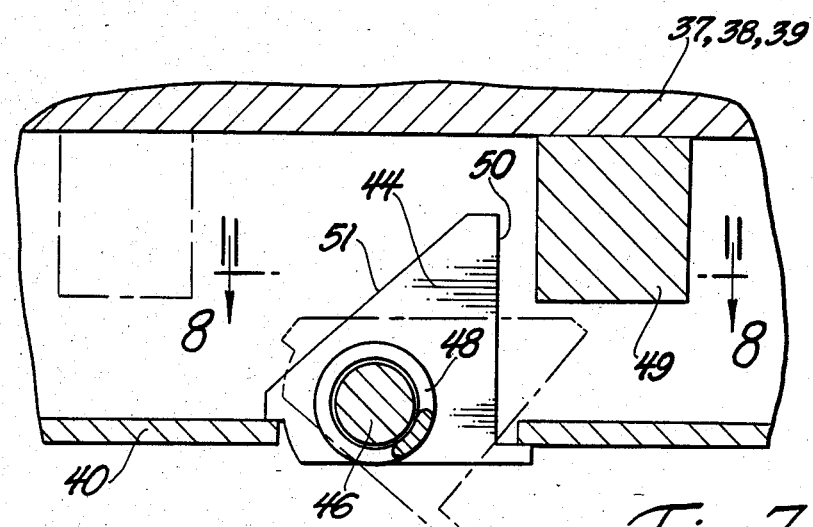
FIG. 7 is a fragmentary sectional view on line 7—7 in FIG. 5.
Figure 8:
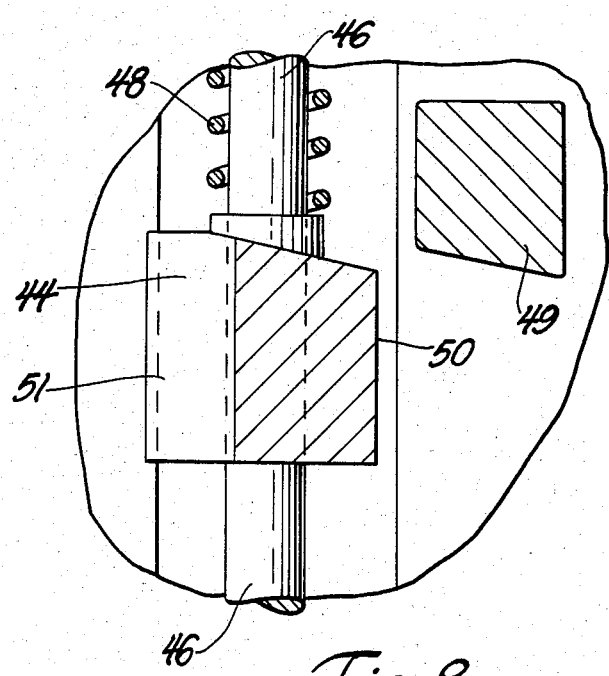
FIG. 8 is a fragmentary sectional view on line 8—8 in FIG. 7.
Figure 9:
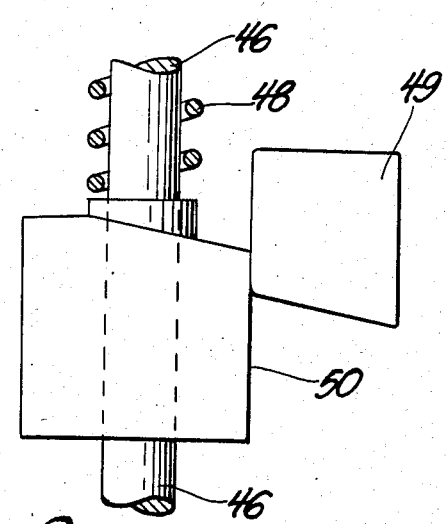
FIG. 9 is a fragmentary view similar to FIG. 8 but showing a clutch element in a different position of adjustment.

FIGS. 7, 8 and 9 indicate generally how the clutch system engages (or disengages). In a clutch-engagement process planet gear 37 (or planet gears 38 and 39) will initially be moving faster than the associated planet gear 28. Assuming that gear 37 is moving to the left (FIG. 7), its lug 49 will abut against face 50 of clutch element 44, thereby contributing a turning force to further speed up the planet gear 28 rotational speed.

As previously noted, planet gears 37, 38 and 39 are sequentially put into driving engagement with planet gears 28. Sequential engagement is controlled by the relative speeds of the various gears 37, 38 and 39, and by the positions of lugs 49 on the various gears 37, 38 and 39. Lugs 49 on the slowest moving gear 39 may be positioned relatively close to the gear rotational axis, lugs 49 on gear 38 may be positioned further away from the gear rotational axis, and lugs 49 on gear 37 may be positioned still further away from the gear rotational axis. Assuming that springs 48 in each case have the same load and same spring rate, the various clutch elements 44 will at any one instant have the same radial positions on the associated gears 28. The lug 49 locations and gear diameters will determine the gear 28 speed at which the respective clutch will be engaged (or disengaged). The radial lengths of lugs 49 may be varied to control the gear 28 speed ranges for the respective clutch engagement cycles.

As seen best in FIG. 7 clutch elements 44 are rotatably positioned on rods 46 to permit elements 44 to overtake lugs 49, as may be necessary at certain times in the cycle. For example, during shift down or slow down periods the gear 28 speed may momentarily be greater than the speed of associated planet gears 37, 38 or 39. A given clutch element 44 can overtake the associated lug 49, whereupon its inclined face 51 cams element 44 out of the lug 49 path. Element 44 can be returned to its operative position (FIG. 7 full lines) by suitable means, not shown. One possibility is a torsion spring incorporated into element 44. It is also believed possible to construct spring 48 so that it functions as the return mechanism, e.g. by anchoring an end of spring 48 on element 44 such that the spring acts torsionally to bias element 44 to its full line operative position.

In an overall sense the illustrated transmission has four forward speed ratios. In the lowest speed range all of the power is delivered to ring gear 16 (FIG. 1) through hydraulic motor 14 and sun gear 26. In the next stage the power is supplied partly by gear 26 and partly by the slow speed gear 39; in this stage sun gear 26 supplies turning forces to the three gears 28, whereas planet gear 39 supplies an added turning force to its associated gear 28. In the next stage the power path can include sun gear 26 and intermediate speed planet gear 38. The highest speed of operation brings gear 37 into operation. Sun gear 26 may or may not contribute to the power delivery process, depending on the load on casing 18.

Figure 10:
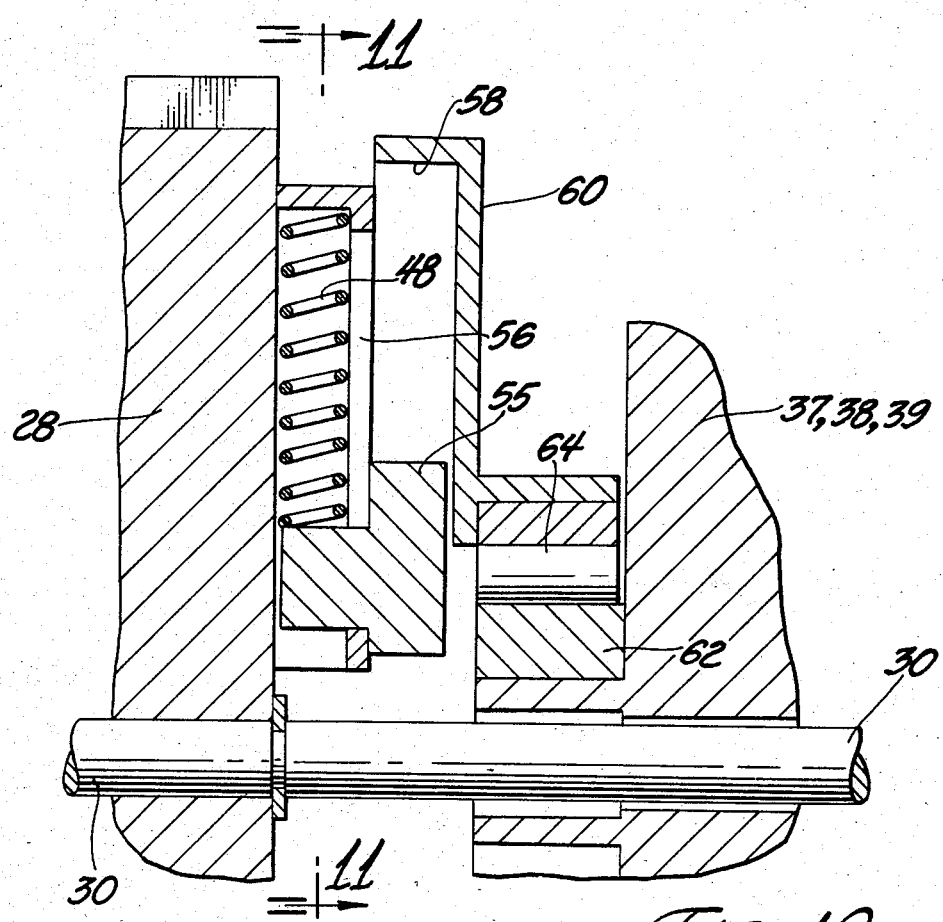
FIGS. 10 and 11 are fragmentary view of centrifugal clutch mechanism that can be used in place of a clutch mechanism shown in FIG. 5.
Figure 11:
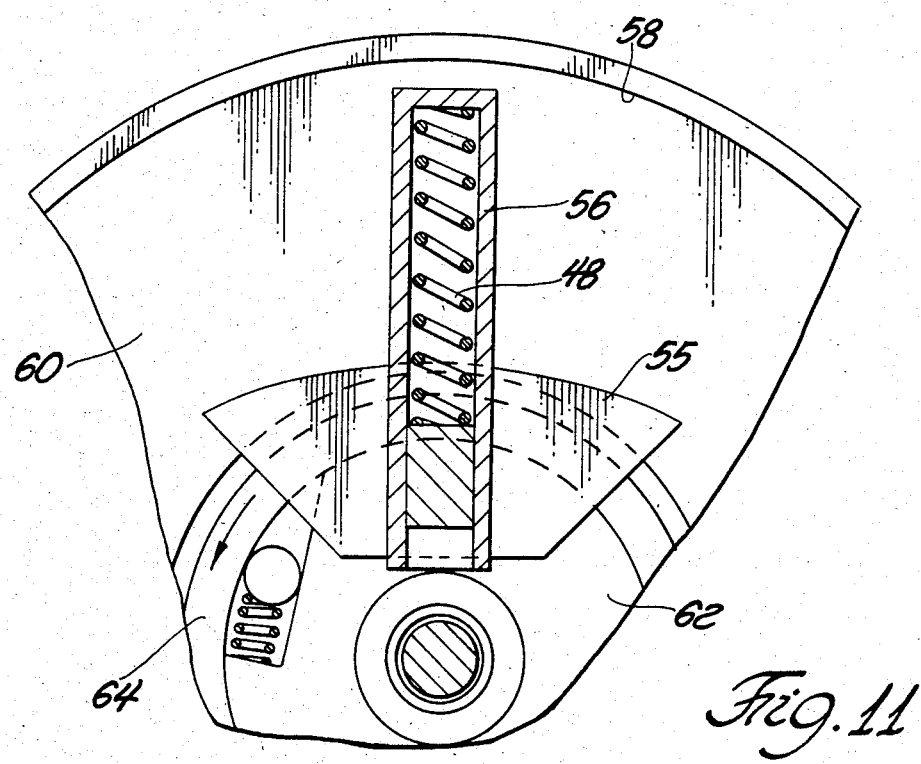

As noted previously, the individual centrifugal clutches (or synchronizers) can be of various designs. FIGS. 10 and 11 show one alternate form that the clutch could take. Each clutch element 55 is slidable in a radial guide 56 suitably affixed to gear 28. Coil spring 48 biases element 55 toward the gear rotational axis. At a predetermined gear 28 speed element 55 is centrifugally thrown outwardly against annular drive surface 58 of clutch member 60. The associated planet gear 37, 38 or 39 mounts the inner race 62 of an overrunning clutch 64. The outer race of the overrunning clutch is attached to member 60.

The illustrated system defines a power path from gear 37 (or gear 38 or gear 39) through clutch 64, member 60, clutch element 55, and gear 28. Overrunning clutch 64 enables gear 37 to overrun gear 28 at certain times in the cycle. The engagement point for clutch element 55 may be varied or selected by the choice of spring 48.

The invention contemplates a power transmission wherein two power paths are produced between an input shaft 10 (FIG. 1) and a ring gear 16. One of the power paths comprises sun gear 26 and planet gears 28. The other power path comprises sun gear 36, planet gears 37, 38 or 39, and the associated centrifugal clutch mechanisms. The centrifugal clutch mechanisms are responsive to changes in gear 28 speed so that planet gears 37, 38 and 39 are sequentially placed into operative engagement with ring gear 16.

The use of three different diameter planet gears 37, 38 and 39 (FIG. 2) contributes to a reduction in overall transmission size and numbers of parts. In a sense the second planetary gear system (sun gear 36 and the associated planets) functions as three planetary gear systems.

The drawings show two forms of the invention wherein the three planet gear sets are operatively connected by means of clutches of the centrifugal type. Centrifugal clutches are well suited because they are automatically operated to the engaged or disengaged conditions without external controls. It is believed however that other type clutches might be employed (e.g. disc clutches). Clutch actuation would be programmed as a response to the speed of sun gear 26 or ring gears 28, or speed differentials between gears 28 and the associated gears 37, 38 or 39. Gear speed sensors would be used to operate the clutches at those times when the various planet gears 37, 38 or 39 are moving synchronously or near synchronously with associated gears 28.

I wish it to be understood that I do not desire to be limited to the exact details of construction shown and described for obvious modifications will occur to a person skilled in the art, without departing from the spirit and scope of the appended claims.

I claim:

1. A power transmission comprising a first sun gear constituting a first drive means, a ring gear constituting a driven output means, a number of first non-orbiting planet gears arranged between the first sun gear and ring gear to constitute a first driving connection; a second sun gear constituting a second drive means, said second sun gear having a different rotational axis than the first sun gear; a number of second non-orbiting planet gears individually rotatable on the same axis as the first planet gears; said second planet gears being meshed with the second sun gear to be driven thereby, each of said second planet gears having a different diameter whereby each said second planet gear has a different rotational speed; and a centrifugal clutch means arranged between each of said first planet gears and the associated second planet gear, whereby when each said first planet gear attains a predetermined rotational speed a second driving connection is established from each second planet gear to the associated first planet gear.

2. The transmission of claim 1, and further comprising a unitary carrier for the first planet gears and second planet gears.

3. The transmission of claim 2, and further comprising a disengageable brake means for the carrier, said first sun gear being effective to produce orbital motion of the planet gears when the brake means is disengaged.

4. A power transmission comprising first sun gear connectable to an engine via a hydrostatic drive means, a second sun gear connectable to an engine via a mechanical drive means; a planet gear carrier having a number of planet shafts outboard from the sun gears; first planet gears freely rotatable on individual ones of the planet shafts and in mesh with the first sun gear; second planet gears freely rotatable on individual ones of the planet shafts and in mesh with the second sun gear; a ring gear engaged with the first planet gears to be driven thereby; and a separate clutch means between each second planet gear and each associated first planet gear.

5. The transmission of claim 4 wherein each separate clutch means is operable to connect its second planet gear to the associated first planet gear at a different first planet gear speed.

6. A power transmission comprising a ring gear (16) constituting a driven output means; a first continually meshed gear means for transmitting a first driving force to said ring gear; a second disengagable gear means for transmitting a second driving force to said ring gear only whe said ring gear is in a high speed range; and clutch means for putting the second gear means into and out of operative engagement with the ring gear; said first gear means comprising a first sun gear (26) and a plural number of first non-orbiting planet gears (28) meshed therewith; said second gear means comprising a second sun gear (36) and a plural number of second non-orbiting planet gears (37, 38 and 39) meshed with said sun gear, each said second planet gear having a different diameter whereby each said second planet gear has a different rotational speed for any given speed of the second sun gear; the aforementioned clutch means comprising a disengagable clutch unit operatively located between each said second planet gear and an associated first planet gear; each clutch unit being operable to transmit a drive force from a second planet gear to an associated first planet gear and thence to the ring gear.

7. The power transmission of claim 6: the first sun gear and the second sun gear having different rotational axes; said first planet gears having the same diameter whereby the first planet gears have the same rotational speed for any given rotational speed of the first sun gear.

8. The power transmission of claim 7; each clutch unit being operated by centrifugal force to operably connect a second planet gear to a first planet gear at a particular rotational speed of the first planet gear; each clutch unit including a number of clutch elements movable by centrifugal force away from the rotational axis of the associated first planet gear, and spring means biasing said clutch elements toward the rotational axis of the associated first planet gear.

9. The power transmission of claim 8: individual ones of said first planet gears and individual ones of said second planet gears being rotatable on the same axis; each clutch unit being operable to transmit a drive force from a given one of the second planet gears to an associated one of the first planet gears when said first planet gear has a predetermined rotational speed.

* * * * *